United States Patent [19] [11] 4,413,113
Gelling et al. [45] Nov. 1, 1983

[54] CONTINUOUS PRODUCTION OF PHENOL-FORMALDEHYDE RESIN AND LAMINATES PRODUCED THEREFROM

[75] Inventors: Paul J. Gelling, Whitley Bay; James E. B. Hunt, Staines; John D. Marshman, Wokingham, all of England

[73] Assignee: Formica Limited, North Shields, England

[21] Appl. No.: 358,780

[22] Filed: Mar. 17, 1982

[30] Foreign Application Priority Data

Apr. 3, 1981 [GB] United Kingdom ............. 8110533

[51] Int. Cl.³ .............................................. C08G 8/10
[52] U.S. Cl. ..................................... 528/165; 428/526; 428/531
[58] Field of Search ........................................ 528/165

[56] References Cited

U.S. PATENT DOCUMENTS

| 2,658,054 | 11/1953 | Coleman et al. | 528/165 X |
| 2,688,606 | 9/1954 | Schmitt et al. | 528/165 X |
| 2,750,354 | 6/1956 | Merriam | 528/165 X |
| 3,308,096 | 3/1967 | Ivanov et al. | 528/165 X |
| 3,657,188 | 4/1972 | Perkins | 528/165 X |

FOREIGN PATENT DOCUMENTS 1323301 7/1970 France.

Primary Examiner—Howard E. Schain

[57] ABSTRACT

A process is disclosed whereby water-soluble phenol-formaldehyde resins are produced from molten phenol and particulate paraformaldehyde in the presence of an alkaline catalyst by reacting in a coil container at a temperature ranging from about 90° C. to 120° C. Apparatus for conducting the reaction and decorative laminates produced from the resultant resin are also disclosed.

6 Claims, 1 Drawing Figure

U.S. Patent
Nov. 1, 1983
4,413,113
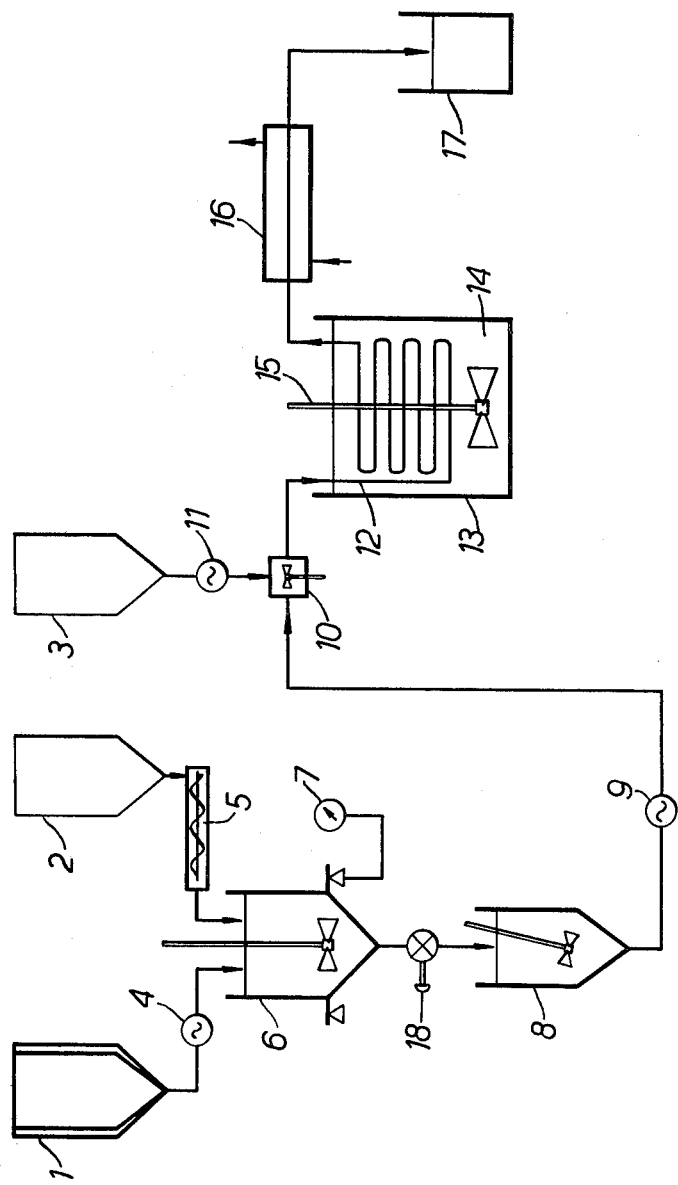

CONTINUOUS PRODUCTION OF PHENOL-FORMALDEHYDE RESIN AND LAMINATES PRODUCED THEREFROM

This invention relates to the continuous production of phenol-formaldehyde resin compositions and, more especially, to the continuous production of phenol-formaldehyde resin compositions having a solids content of at least 70% by weight without a drying operation.

Phenol formaldehyde resins along with other conventional resins such as urea-formaldehyde and melamine-formaldehyde resins are known, from the mechanism of their formation, as condensation resins. The condensation reaction which occurs between the formaldehyde and the other active entity (usually in the presence of an alkaline or acid catalyst) is exothermic and, in order effectively to control the exotherm to prevent a run-away reaction and/or the production of resins with undesired properties, the condensation and resin formation is conventionally carried out in aqueous systems whereby the water present acts as a moderator, rendering control of the exotherm more easily achievable. However, the presence of the added water (and that produced during the condensation reaction) is normally not required in a product comprising the reacted resin composition and hence a drying stage or stages conventionally follow the resin reaction stage. For example, in the production of conventional thermoset plastics laminates, it is customary to produce the phenol-formaldehyde resin used to impregnate the core sheets in a batch process, employing aqueous solutions of formaldehyde (e.g. 37% or 44% HCHO); most of the free water is then removed from the system by evaporation (optionally under reduced pressure) and the core impregnated with the partially dried resin composition; the impregnated core is then, conventionally, dried further in an oven before being used to prepare the desired laminate.

The drying stage or stages are clearly undesirable, for not only does the drying require an energy input, but further, because the condensation reaction rarely proceeds to completion, there are free reactants present in the resin composition and these are driven off during the drying operation, leading to effluent disposal and environmental pollution problems.

The production of condensation resins by batch processes has a number of disadvantages such as, for example:

(a) variation in composition of the product from batch to batch;

(b) the production of large batches is difficult because of the increased exotherm control problems with large volume vessels; and (c) any errors in control or formulation often leads to the rejection of the entire batch of resin, with consequent economic and production penalties.

To overcome these disadvantages and to provide a method whereby greater flexibility in production is available, investigations have been carried out into the production of condensation resins on a continuous basis. As a consequence of these investigations, a number of processes have been described whereby condensation resins, and especially phenol-formaldehyde resins, may be prepared on a continuous basis.

As a major technical problem to be overcome in the production of these resins is the control of the exotherm, one of the principal concerns of the originators of the various forms of equipment known has been to provide a reactor wherein the heat arising during the condensation may be effectively and controllably dissipated. A number of reactor designs have been proposed including, for example, a sequential tank system, a scraped wall tubular reactor and a coil reactor, but in all of the known continuous processes for the production of phenol-formaldehyde resins it has been necessary to carry out the reaction in the presence of added water (to act as a moderator) and, subsequently, to dry the product before its application. Usually, the added water is introduced into the system in the form of a solvent for the formaldehyde (which is commercially available as aqueous solutions—formalin—having a formaldehyde content of up to about 44%) and consequently the resin composition, as produced, customarily has a solids content of less than 50% by weight.

In one known process for producing phenol-formaldehyde resin compositions by a continuous process using a coil reactor (U.K. Pat. No. 1323301) a homogenous mixture of phenol, formaldehyde solution and an alkaline catalyst is prepared at a temperature not exceeding 45° C. and the homogenous reaction mixture pumped through a metal coil immersed in a fluid held at a temperature of from 80° C. to 90° C. The condensation reaction takes place during passage of the mixture through the coil and the resin composition is then cooled and neutralised. The formaldehyde solution employed has a concentration of 37% by weight and the resin composition produced directly therefrom has, typically, a water content of about 56% by weight.

It has been found that by employing formaldehyde in its substantially dry polymeric form (paraformaldehyde), thermosettable phenol-formaldehyde resin compositions having a solids content of not less than 70% can be produced directly (i.e. without a water-removal stage) by using a tubular reactor immersed in a heat exchange liquid maintained at a temperature of 90° C. to 120° C.

In accordance with the invention, a process for continuously producing a thermosettable phenol-formaldehyde resin composition comprises:

(a) forming a slurry of molten phenol and particulate paraformaldehyde at a temperature of from about 45° C. to about 60° C.;

(b) continuously forming a stream of said slurry and mixing therewith an alkaline condensation catalyst;

(c) continuously reacting said alkaline catalysed slurry stream by passage through a tube reactor immersed in a heat exchange liquid maintained at a temperature of 90° to 120° C. so as to provide directly a thermosettable phenol-formaldehyde resin composition having a solids content of not less than 70% by weight; and optionally, (d) continuously cooling said composition to such a temperature that reaction between the components thereof is substantially suppressed.

It is preferred that both the phenol and paraformaldehyde reactant materials be substantially pure and free of extraneous water. It is more preferred to use phenol of at least 95% (and preferably about 99%) purity and paraformaldehyde having a formaldehyde equivalent of at least 81% and, more preferably, 97%.

The relative proportions of the reactants may be varied over a wide range. Thus the ratio of paraformaldehyde to phenol in the slurry may be such that the latter comprises paraformaldehyde sufficient to contribute a mole ratio of 0.6 moles and upwards of formaldehyde per mole of phenol; however, it is preferred that the proportions of paraformaldehyde to phenol be such that the mole ratio of formaldehyde to phenol in the slurry is in the range 0.9 to 3.0:1, and, more preferably, 1.5 to 2.0:1.

The alkaline condensation catalyst may be any known for such use and may be employed in any suitable form. For example, the catalyst may comprise ammonia in gaseous or aqueous solution form, or an aqueous solution or suspension of sodium or barium hydroxide. It is preferred to employ a 30% aqueous solution of sodium hydroxide. The amount of catalyst employed is such as to produce the required product and varies with the catalyst employed. Suitably the amount of catalyst used is about 0.05 mole per mole of phenol and when the catalyst is sodium hydroxide it is preferred to employ from about 0.03 to about 0.07 moles of catalyst per mole of phenol. The proportion of catalyst to reactants to be employed is preferably determined by prior experiment.

According to a second aspect, the invention also relates to an apparatus for carrying out the process comprising storage vessels for molten phenol, paraformaldehyde and the alkaline catalyst, a slurry make-up vessel into which molten phenol and paraformaldehyde are metered from their respective storage vessels and mixed to form a slurry at a temperature in the range 45° to 60° C., a slurry feed vessel which receives said slurry, a first metering pump whereby slurry from the slurry feed vessel is passed at a desired rate to a mixer, which mixer also receives alkaline catalyst from the catalyst storage vessel at a desired rate by means of a second metering pump and mixes said slurry with said catalyst to provide an alkaline catalysed slurry stream, a tubular reactor, immersed in a heat exchange liquid at a temperature of 90° to 120° C., which reactor receives said stream and conveys same to a cooling device whereby the emergent product is cooled to a temperature whereby further reaction is substantially suppressed.

As mentioned above, the condensation between the phenol and paraformaldehyde reactants in the presence of an alkaline catalyst is highly exothermic. Further, it is a rapid reaction in which the viscosity of the fluid mixture changes markedly with the degree of condensation. In order that the reaction proceeds smoothly to a desired degree of condensation and that blockage of the tube reactor is avoided, it is necessary for the evolved heat to be removed from the reactant stream at such a rate that local overheating and the production of a solid product within the apparatus are avoided.

This requires that the tube diameter, the rate of passage of the reaction mixture through the tube and the rate of heat transfer from the reaction mixture through the wall of the tube to the heat exchange liquid must be such that in combination the required rate of heat removal from the reaction mixture is achieved. Further, in order that the desired degree of condensation takes place during passage of the reaction mixture through the tube reactor the tube must be of sufficient length so that, in combination with the rate of passage therethrough, the mixture is resident for a sufficient period of time. Suitably, the appropriate combination of these factors is determined by prior experiment and calculation.

While the tube reactor may comprise a straight tube or one with any desired convolutions, provided sharp bends are avoided, it is preferred for the sake of ease of fabrication and space limitation to provide the tube reactor in the form of a coil and to situate the coil in a cylindrical tank which contains the heat exchange liquid. Further, to avoid undesirable connections through the sides or bottom of the tank, it is preferred for both the inlet and outlet of the coil to pass through the free surface of the heat exchange liquid.

The tube reactor may be fabricated from any material that substantially resists attack by the reaction mixture and the heat exchange liquid whilst affording the desired degree of heat transfer. It is preferred to fabricate the reactor from metals such as stainless steel, copper or corrosion-resistant alloys and more preferably from copper or that alloy tubing commonly employed in vehicle braking systems known as 'Kunifer' tubing. These two latter materials are relatively easily worked to provide the desired configuration and further because of their relatively low cost, offer an added advantage as that in the event of a blockage occurring in the tube they can be replaced without incurring a high cost penalty.

Further, the tube reactor may comprise a tube having any desired cross-sectional conformation, i.e. it may be oval, square or circular in section and the tube may be finned so as to provide a greater external surface and consequentially, a greater area for heat exchange.

Still further, whilst the reactor may be of constant cross-section throughout its length, it is preferred to employ a tube reactor the cross-sectional area of the last portion of which is greater than that of the first portion.

In this preferred embodiment, the reactor coil is made of metal tubing of circular cross-section and comprises two portions. The first portion (extending for about one-half of the coils length) having an internal diameter which is less than that of the second portion. More especially, the cross-sectional area of the first portion is such that, in conjunction with the rate of flow of the reaction mixture therethrough, turbulent flow conditions result. In this first portion of the reactor coil the resinforming reaction is taking place at a high rate and, consequently, heat is being rapidly liberated and turbulent flow of the material in this portion ensures that good heat transfer characteristics are obtained so that the rate of dissipation of the heat liberated by the exothermic reaction is sufficient to avoid over-reaction of the components, the formation of a solid resin and blockage of the reactor coil.

The second portion of the coil is smoothly joined to the first so as not to present a restriction to the flow of the reaction mixture and its diameter is such that the flow therethrough is 'streamline' in nature. During passage through this second portion, reaction continues with the reaction mixture increasing in viscosity but the increased cross-sectional area of the coil in this portion is such that it at least partially compensates for the increasing viscosity and hence avoids a build-up of a back-pressure in the coil sufficient to reduce flow to a level whereby overcondensation of the reactants and blockage of the coil results.

In accordance with the invention, the production of a thermosettable phenol-formaldehyde resin having a solids content of at least 70% by weight from molten phenol, particulate para-formaldehyde and a 30% caustic soda catalyst solution will now be described by way of illustration with reference to the drawing.

Molten phenol at a temperature of between about 50° and 60° C. having a phenol content of 98% is charged into the phenol storage vessel 1 which comprises a jacketed stainless steel vessel provided additionally with an internal coil (not shown), through which and through the jacket, hot water is circulated to maintain the temperature of the phenol above its melting point.

Particulate paraformaldehyde having a formaldehyde concentration of 99% is charged into storage vessel 2 fabricated of steel and provided with a conical base opening into the feed inlet of a screw conveyor 5.

Molten phenol is transferred from the storage vessel 1 via pump 4 into the slurry make-up vessel 6 where it is mixed with paraformaldehyde transferred to the vessel by means of the conveyor 5 to produce a slurry comprising the particulate paraformaldehyde dispersed in molten phenol.

The make-up vessel is made of stainless steel and is fitted with a stirrer and a water jacket (not shown) whereby the slurry is maintained at a temperature of about 45° C. to 47° C. The make-up vessel is mounted on a load sensitive device 7 and the desired slurry composition is achieved by feeding the paraformaldehyde by means of the conveyor 5 until a second (higher) set weight is reached.

Situated vertically below the make-up vessel is a stainless steel slurry feed vessel 8 provided with a water jacket and stirrer (not shown).

When the required slurry composition has been formed in the make-up vessel, a valve 18 is opened allowing the slurry to pass into the feed vessel. A timing device linked to the valve, the pump 4, the conveyor 5 and the load sensitive device 7, ensures that after the slurry has passed into the slurry feed vessel, valve 18 closes and the make-up vessel is recharged with phenol and paraformaldehyde and a further batch of slurry is prepared.

The slurry feed vessel is of such a size that it can contain more than the batch of slurry from the make-up vessel and its principal purpose is to act as a holding tank whereby a continuous stream of slurry can be drawn out of it while it is filled on a batch basis.

The slurry from the feed vessel is then pumped by means of a metering pump 9 to an in-line mixer 10 where it is mixed with a 30% aqueous caustic soda solution which is fed to the mixer from the catalyst storage vessel 3 by means of a metering pump 11.

The alkaline catalysed slurry emerging from the mixer enters and is caused to feed through (by means of the pressure exerted by the metering pump 9) a reactor coil 12 situated in a cylindrical tank 13 filled with a heat exchange liquid 14 (suitably water). The tank is provided with circulating means (not shown) whereby the heat exchange liquid may be heated or cooled so as to provide a constant temperature—determined by prior experiment of between 90° and 120° C. A stirrer 15 is provided in the tank to ensure an even temperature throughout and the tank is provided with a condenser (not shown) so that any vapourised heat exchange liquid is condensed and returned to the tank.

The reacted mixture leaving the reaction coil is then preferably passed to the cooler 16 whereby the resin produced in the coil is cooled, suitably by heat exchange with a fluid such as water, to a temperature at which reaction between unreacted components of the mixture is substantially suppressed. The cooled resin is then passed to a storage vessel 17, or used immediately.

Alternatively, the resin may, if desired, be passed directly from the reactor coil is a treater, whereby it is used for its desired purpose, e.g. the impregnation of fibrous sheets and then optionally the treated material may be cooled. When the product resin is to be stored before used, it is preferred to cool it to prevent continuing reaction of any unreacted reactants resulting in an over-condensed resin.

While thermosettable phenol-formaldehyde resins produced in accordance with the invention may be used for any of the known purposes for such resins, for example in adhesives or glass-fibre phenolic resin composites, they are especially useful in the production of thermoset plastics laminates.

As prepared, the resins have volatile contents, flow characteristics and reactivities desired for the core resins of such laminates. More especially the kraft paper webs conventionally employed to provide the cores of the laminates may be impregnated directly with the novel resins and the impregnated webs, without an intermediate drying stage, used to provide the core sheets of the laminate assembly.

As related above, during the production of thermoset plastics laminates using conventional thermosettable phenol-formaldehyde resins, the kraft paper webs are impregnated with a solution of the resin in a suitable solvent and the impregnated webs then dried before they are sheeted. The drying of conventional resin-impregnated webs is undesirable for a number of reasons, for example, it is an operation requiring the utilisation of human and energy resources, the effluent from the drying oven comprises potential pollutants and steps have to be taken to dispose of them safely so as to prevent detrimental environmental effects and, further, the loss of volatile matter from the drying operation is economically wasteful.

By the use of resins prepared according to the invention, these unwanted and wasteful consequences of drying conventional impregnated webs are avoided or minimised and the need to provide high-cost drying ovens eliminated.

In accordance with a further aspect of the invention, a method for the production of a decorative thermoset plastics laminate comprises:

(a) forming a thermosettable phenol-formaldehyde resin composition having a solids content of at least 70% directly by a continuous process from a slurry of molten phenol and particulate para formaldehyde;

(b) impregnating a kraft paper web with said resin composition;

(c) forming an assembly comprising:
  (i) one, or a plurality in superimposed relationship, of resin impregnated kraft paper sheets cut from said web;
  (ii) a thermosettable melamine-formaldehyde resin impregnated decorative fibrous sheet; and optionally, either
  (iii) a coating of a thermosettable melamine-formaldehyde resin composition on the decorative surface of the decorative paper sheet; or
  (iv) a thermosettable melamine-formaldehyde resin impregnated alpha-cellulose overlay paper sheet; and (d) consolidating said assembly to provide a unitary decorative thermoset plastics laminate by the application of heat and pressure.

In accordance with another aspect of the invention a novel decorative plastics laminate is disclosed, said laminate being the unitary thermoset product obtained by the heat and pressure consolidation of an assembly comprising:

(a) a core layer, comprising one, or a plurality in superimposed relationship, of kraft paper sheets impregnated with a thermosettable phenolic-formaldehyde resin composition having a solids content of at least 70% and produced directly in a continuous manner from a slurry of particulate para formaldehyde in molten phenol;

(b) a decorative layer, being a thermosettable melamine-formaldehyde resin impregnated decorative fibrous sheet, and, optionally, (c) a wear layer being either a coating of a thermosettable melamineformaldehyde resin coating on the decorative fibrous sheet or, a thermosettable melamine-formaldehyde resin impregnated alpha-cellulose overlay paper sheet.

The kraft paper web employed is suitably selected from those kraft webs customarily employed in the production of conventional decorative laminates. The base weight of the web being such that in conjunction with the number of sheets employed it provides the laminate with a core layer having the required dimensions and properties.

Similarly, the melamine resin impregnated decorative fibrous sheet and the coating or overlay sheet (when employed) are those sheets or coatings customarily used in the manufacture of decorative laminates. Preferably the decorative fibrous sheet is a decorative paper sheet. Selection being made so as to provide the product laminate with the decorative appearance, wear and other properties desired.

The conditions of heat and pressure used to consolidate the assembly to a unitary structure are, suitably, those used in the production of conventional laminates and the consolidation is preferably carried out using those press-plates, release sheets, etc. conventionally employed in the production of known laminates.

In the following Examples, which are given by way of illustration, Examples 1 to 8 disclose the production of novel thermosettable phenolic resins according to the invention, in a preferred form of the apparatus, whilst Examples A to F disclose the use of the resins as produced in the production of novel thermoset plastics laminates. (All parts and percentages are by weight).

EXAMPLE 1

100% phenol was charged into the phenol storage vessel where it was converted to the molten state and maintained at a temperature of about 60° C. by means of hot water circulating through the jacket and the paraformaldehyde storage vessel was charged with powdered paraformaldehyde having a formaldehyde content of about 97%.

Molten phenol from the storage vessel was then pumped into the make-up vessel until 94 parts of phenol had been transferred as indicated by the load sensitive means. When the desired amount of phenol has been transferred 54.1 parts of paraformaldehyde were added to the vessel. A slurry of the formaldehyde in the molten phenol was formed by operation of the stirrer and the slurry (which had a mole ratio of formaldehyde to phenol of 1.75:1) was maintained at a temperature of 47° C. by the hot water circulating means.

The batch of slurry so formed was allowed to pass to the feed vessel the contents of which were also maintained at 47° C. In the vessel it mixed with slurry prepared in previous batches and the mixed slurry was pumped to the in-line mixer at a rate of 80 Kg/hour.

In the mixer the slurry was mixed with a 30% aqueous sodium hydroxide solution which was pumped to the mixer at a rate of 3.6 Kg/hour from its storage vessel.

The alkaline catalysed slurry, at a temperature of about 47° C. was then passed into the coiled reactor which was made of "Kunifer" tubing and comprised a first (inlet) portion 67.2 m long having an internal diameter of 4.9 mm and a second (outlet) portion 76.2 m long having an internal diameter of 8.1 mm. The tube which was continuous and provided with a belled junction between the first and second section, was coiled into a spiral having a diameter of about 0.75 m and it was positioned in a stirred cylindrical tank containing water which was maintained at 100° C.

The reacted product leaving the reactor tube at 100° C. was passed through a heat exchange cooling apparatus such that the outlet temperature was about 25° C. (at which temperature reaction between the components was substantially suppressed) and the thermosettable phenolic resin product was a clear viscous liquid having the properties related in Table 1.

EXAMPLE 2

Example 1 was repeated in all respects except that the proportion of paraformaldehyde to phenol in the slurry was 46.4:94.0 and the slurry (which had a mole ratio of formaldehyde to phenol of 1.5:1) was pumped at a rate of 95 Kg/hour to the in-line mixer where 4.5 Kg/hour of the aqueous caustic soda catalyst solution was mixed in.

The thermosettable phenolic resin produced (after cooling to suppress further reaction) had the properties shown in Table 1.

EXAMPLE 3

Example 1 was repeated in all respects except that the proportion of paraformaldehyde to phenol in the slurry was 61.9:94.0 and the slurry (having a mole ratio of formaldehyde to phenol of 2.0:1) was pumped to the in-line mixer at a rate of 75.8 Kg/hour and was mixed therein with 3.2 Kg/hour of a 30% aqueous caustic soda catalyst solution. The properties of the resin produced are shown in Table 1.

EXAMPLE 4

Example 2 was repeated in all respects except that the slurry was pumped to the in-line mixer at a rate of 65.0 Kg/hour where it was mixed with 3.75 Kg/hour of triethylamine as catalyst. After cooling to a temperature of about 18° C., the resin had the properties shown in Table 1.

EXAMPLE 5

Example 3 was repeated in all respects except that the slurry was pumped as a rate of 65.0 Kg/hour to the in-line mixer where it was mixed with 13.2 Kg/hour of a catalyst slurry of 1 part of barium hydroxide in 1 parts of water.

The product resin was light straw coloured, slightly hazy and had the properties shown in Table 1.

EXAMPLE 6

Example 2 was repeated in all respects except that the slurry was pumped to the in-line mixer at a rate of 80.0 Kg/hour and mixed therein with 4.8 Kg/hour of a solution comprising 1 part of 35% ammonia solution and 1.47 parts of a 30% sodium hydroxide solution. The product resin, after cooling to about 18° C., had the properties shown in Table 1.

EXAMPLE 7

Example 1 was repeated in all respects except that the proportion of paraformaldehyde to phenol in the slurry was 92.8:94.0 and the slurry (which had a mole ratio of formaldehyde to phenol of 3.0:1) was pumped at the rate of 110 Kg/hour to the in-line mixer where 3.93 Kg/hour of the alkaline catalyst solution was mixed in.

The thermosettable phenolic resin produced (after cooling to suppress further reaction) had the properties shown in Table 1.

EXAMPLE 8

Example 1 was repeated in all respects except that the proportions of paraformaldehyde to phenol in the slurry was 40.2:94.0 and the slurry (which had a mole ratio of formaldehyde to phenol bo 1.3:1) was pumped at a rate of 80 Kg/hour to the in-line mixer, where 3.97 Kg/hour of the alkaline catalyst solution was mixed in.

The thermosettable phenolic resin produced (after cooling to suppress further reaction) had the properties shown in Table 1.

TABLE I

| Example No. | Viscosity (Ns/m$^2$) @ 25° C. | A.S. Solids (%) | Gel Time (Resin @ 120° C.) | Free Phenol % | Free Formaldehyde % |
| --- | --- | --- | --- | --- | --- |
| 1 | 2.57 | 78.1 | 9.0 | 9.4 | 3.1 |
| 2 | 1.094 | 77.2 | 11.0 | 14.6 | 2.9 |
| 3 | 4.57 | 78.7 | 6.5 | 5.1 | 4.1 |
| 4 | 2.44 | 76.2 | 8.0 | 16.2 | 7.6 |
| 5 | 0.59 | 73.7 | 6.5 | 1.8 | 2.3 |
| 6 | 2.00 | 78.5 | 11.5 | 11.1 | 1.3 |
| 7 | 3.92 | 72.1 | 10.3 | 0.8 | 15.8 |
| 8 | 0.64 | 76.1 | 11.0 | 14.3 | 2.0 |

The production of decorative thermoset plastics laminates produced from thermosettable phenolic resins in accordance with the invention are given below in the following Examples A to F.

EXAMPLE A

The thermosettable phenolic resin prepared as related in Example 1 was applied by a conventional reverse-roll coating technique to a web of conventional kraft core paper having a moisture content of 6.1%. The application rate being such as to provide a resin impregnated kraft paper web comprising 27.8% resin. Without any intermediate drying stage, a decorative high-pressure laminate was prepared by forming an assembly comprising in superimposed relationship:

(i) 5 sheets of thermosettable phenolic resin-impregnated kraft paper cut from the impregnated web prepared as related above;

(ii) a conventional thermosettable melamine-formaldehyde impregnated decorative paper sheet; and (iii) a conventional thermosettable melamine-formaldehyde impregnated alpha-cellulose overlay sheet.

The assembly was then positioned in relationship with the customary press-plate and release sheets and consolidated by means of heat and pressure, using those conditions customarily used for laminates comprising conventionally impregnated core sheets, to provide a decorative high-pressure thermoset plastics laminate which when tested in accordance with the usual test methods exhibited the properties shown in Table 2.

EXAMPLE B

A decorative laminate was prepared as related in Example A except that the kraft paper web before application of the resin had been pre-dried to a moisture content of 2.3% and the application rate was such as to provide an impregnated web having a resin content of 26.8%.

The properties of the laminate produced are shown in Table 2.

EXAMPLE C

A decorative laminate was prepared as related in Example A except that the resin used was that prepared as described in Example 2, the kraft paper had an initial moisture content of 7% and the resin impregnated web had a resin content of 24.7%.

The properties of the product laminate are shown in Table 2.

EXAMPLE D

Example C was repeated in all respects except that before impregnation the kraft paper was pre-dried to a moisture content of 4% and the application of the resin to the paper was such as to provide, in the impregnated paper, a resin content of 24%.

Again the properties of the product laminate are related in Table 2.

EXAMPLE E

A thermosettable phenolic resin prepared in accordance with Example 3 was applied to a kraft paper web (having a moisture content of 7%) to provide an impregnated web having a resin content of 22.9%. A decorative laminate was prepared therefrom and the properties of the product laminate are related in Table 2.

EXAMPLE F

A decorative laminate was prepared as in Example E except that before impregnation of the kraft paper it was pre-dried to a moisture content of 2.5% and then impregnated with resin prepared in accordance with Example 3 to a resin content of 22%.

The properties of the decorative laminate thus prepared are shown in Table 2.

COMPARATIVE EXAMPLE

Part of the treated paper web prepared as related in Example E was passed through a forced-air drying oven with the air temperature at 145° C. The residence time in the oven was 48 seconds and the volatile content of the web was reduced by 3.9%.

Core sheets were cut from the dried impregnated web and used to prepare a decorative laminate similar in all respects to that of Example E.

When tested, it exhibited the properties shown in Table 2.

TABLE 2

| Example | Flexural Strength (MNm$^{-2}$) | | | | Flexural Modulus (MNm$^{-2}$ × 10$^{-3}$) | | | | Dimensional Movement | | Water Absorption % Change in | |
|---|---|---|---|---|---|---|---|---|---|---|---|---|
| | Dec. Face in Compression | | Dec. Face in Tension | | Dec. Face in Compression | | Dec. Face in Tension | | | | | Thickness |
| | L | T | L | T | L | T | L | T | L | T | Wt. | |
| A | 264 | 229 | 166 | 135 | 14.97 | 10.37 | 14.56 | 10.25 | 0.45 | 0.75 | 7.1 | 6.4 |
| B | 270 | 218 | 163 | 127 | 15.53 | 9.82 | 15.71 | 10.81 | 0.21 | 0.79 | 6.5 | 4.38 |
| C | 280 | 237 | 158 | 134 | 13.5 | 8.0 | nt | nt | 0.21 | 0.78 | 4.7 | 4.3 |
| D | 254 | 175 | nt | nt | 15.5 | 8.0 | nt | nt | 0.14 | 0.86 | 7.8 | 7.5 |
| E | 280 | 231 | 160 | 142 | nt | nt | nt | nt | 0.36 | 0.79 | 6.2 | 5.3 |
| F | 290 | 222 | 163 | 134 | nt | nt | nt | nt | 0.29 | 0.79 | 6.2 | 4.9 |
| Comparative | 296 | 232 | 171 | 130 | nt | nt | nt | nt | 0.27 | 0.76 | 5.3 | 4.9 |
| Standard | — | 120 (min) | — | 80 (min) | — | — | — | — | 0.5 (max) | 0.9 (max) | 10 (max) | 10 (max) |

N.B.:
nt = not tested
L = longitudinal direction
T = transverse direction

The level of properties which decorative laminates are required to attain in order to conform to British Standard Specification No. 3794 are shown in the last row of Table 2 and it is apparent that laminates prepared from resins in accordance with the invention conform to that Standard.

We claim:

1. A process for the continuous production of water-soluble, phenol-formaldehyde resins comprising:
   (a) continuously producing a slurry of molten phenol and particulate paraformaldehyde,
   (b) mixing said slurry with an alkaline catalyst,
   (c) reacting the resultant mixture in a coil container which is of sufficient length to enable substantially complete reaction of the phenol and paraformaldehyde to a water-soluble resinous state and which is immersed in a fluid at a temperature of from 90° C. to 120° C., for a period of time such that a clear, viscous, homogeneous, liquid resin solution is formed
   (d) cooling said homogeneous, liquid, resin solution to a temperature such that reaction between the phenol and paraformaldehyde is suppressed and
   (e) recovering the resultant resin, in the absence of water removal, as a solution of at least 70% solids.

2. A process according to claim 1 wherein the catalyst is sodium hydroxide, ammonium hydroxide, barium hydroxide or triethylamine.

3. A process according to claim 1 wherein the phenol used is of at least 90% content, by weight.

4. A process according to claim 1, wherein the paraformaldehyde used has a formaldehyde equivalent of at least 81%, by weight.

5. A process according to claim 1, wherein the molar ratio of formaldehyde to phenol in the slurry is from 0.9 to 3.0.

6. A water-soluble phenol/formaldehyde resin, produced according to the process of claim 1.

* * * * *